United States Patent
Zhu et al.

(10) Patent No.: US 12,397,938 B2
(45) Date of Patent: Aug. 26, 2025

(54) AERIAL VEHICLE PATH DETERMINATION

(71) Applicant: Skydio, Inc., Redwood City, CA (US)

(72) Inventors: Jack Louis Zhu, San Mateo, CA (US); Margaret Bai Wang, Palo Alto, CA (US); Maximilian Joseph Halper Krogius, San Mateo, CA (US); Kristen Marie Holtz, Menlo Park, CA (US); Shreetej Varakantam Reddy, San Mateo, CA (US); Hayk Martirosyan, San Francisco, CA (US); Peter Benjamin Henry, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 91 days.

(21) Appl. No.: 17/717,848

(22) Filed: Apr. 11, 2022

(65) Prior Publication Data
US 2023/0242250 A1    Aug. 3, 2023

Related U.S. Application Data

(60) Provisional application No. 63/305,178, filed on Jan. 31, 2022.

(51) Int. Cl.
*B64U 50/19* (2023.01)
*G01C 21/20* (2006.01)
(Continued)

(52) U.S. Cl.
CPC ............. *B64U 50/19* (2023.01); *G01C 21/20* (2013.01); *G05D 1/1064* (2019.05); *G06T 3/40* (2013.01);
(Continued)

(58) Field of Classification Search
CPC .... B64C 39/024; G01C 21/20; G01C 21/005; G05D 1/1064; G05D 1/0016; G05D 1/0274; G05D 1/106; G06T 3/40; B64U 10/13; B64U 2201/00; B64U 50/19; B64U 2101/30; B64U 2201/10
See application file for complete search history.

(56) References Cited

U.S. PATENT DOCUMENTS 10,685,575 B1 * 6/2020 Pareek ................. G06T 7/0002
11,037,320 B1 * 6/2021 Ebrahimi Afrouzi ..... G06T 7/90
(Continued)

OTHER PUBLICATIONS

H. Oleynikova, Z. Taylor, R. Siegwart and J. Nieto, "Sparse 3D Topological Graphs for Micro-Aerial Vehicle Planning," 2018 IEEE/RSJ International Conference on Intelligent Robots and Systems (IROS), Madrid, Spain, 2018, pp. 1-9, doi: 10.1109/IROS.2018.8594152. (Year: 2018).*

*Primary Examiner* — Faris S Almatrahi
*Assistant Examiner* — Dana F Artimez
(74) *Attorney, Agent, or Firm* — Young Basile Hanlon & MacFarlane, P.C.

(57) ABSTRACT

A computer stores dense maps generated by one or more aerial vehicles. The computer generates a global graph based on the dense maps and a sparse map. The computer stores a representation of one or more paths traversed by the one or more aerial vehicles within the global graph. The computer determines a path from an origin location to a destination location based on the global graph. The determined path enables an aerial vehicle to avoid objects.

26 Claims, 13 Drawing Sheets

(51) Int. Cl.
*G05D 1/00* (2006.01)
*G06T 3/40* (2024.01)
*B64U 10/13* (2023.01)

(52) U.S. Cl.
CPC .......... *B64U 10/13* (2023.01); *B64U 2201/00* (2023.01); *G05D 1/0016* (2013.01)

(56) References Cited

U.S. PATENT DOCUMENTS

| | | | | |
|---|---|---|---|---|
| 11,561,553 | B1* | 1/2023 | Dydek | G05D 1/0246 |
| 2016/0304198 | A1* | 10/2016 | Jourdan | G05D 1/042 |
| 2018/0075643 | A1* | 3/2018 | Sequeira | G06T 15/10 |
| 2019/0051198 | A1* | 2/2019 | Nimmagadda | G05D 1/0274 |
| 2019/0080142 | A1* | 3/2019 | Abeywardena | G01C 21/32 |
| 2020/0132822 | A1* | 4/2020 | Pimentel | G05D 1/101 |
| 2020/0198140 | A1* | 6/2020 | Dupuis | G01C 21/20 |
| 2023/0003533 | A1* | 1/2023 | Ma | G01C 21/34 |

\* cited by examiner

AERIAL VEHICLE PATH DETERMINATION

CROSS-REFERENCE TO RELATED APPLICATION(S)

This application claims priority to U.S. Provisional Patent Application No. 63/305,178, titled "AERIAL VEHICLE PATH DETERMINATION," filed on Jan. 31, 2022, the entire disclosure of which is incorporated herein by reference.

TECHNICAL FIELD

This disclosure relates to determining a path for an aerial vehicle in a three-dimensional space.

BACKGROUND

Typically, an unmanned aerial vehicle (UAV) is controlled by a human from a ground-based controller. However, in some cases, automatic path determination and navigation of the UAV may be desirable.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
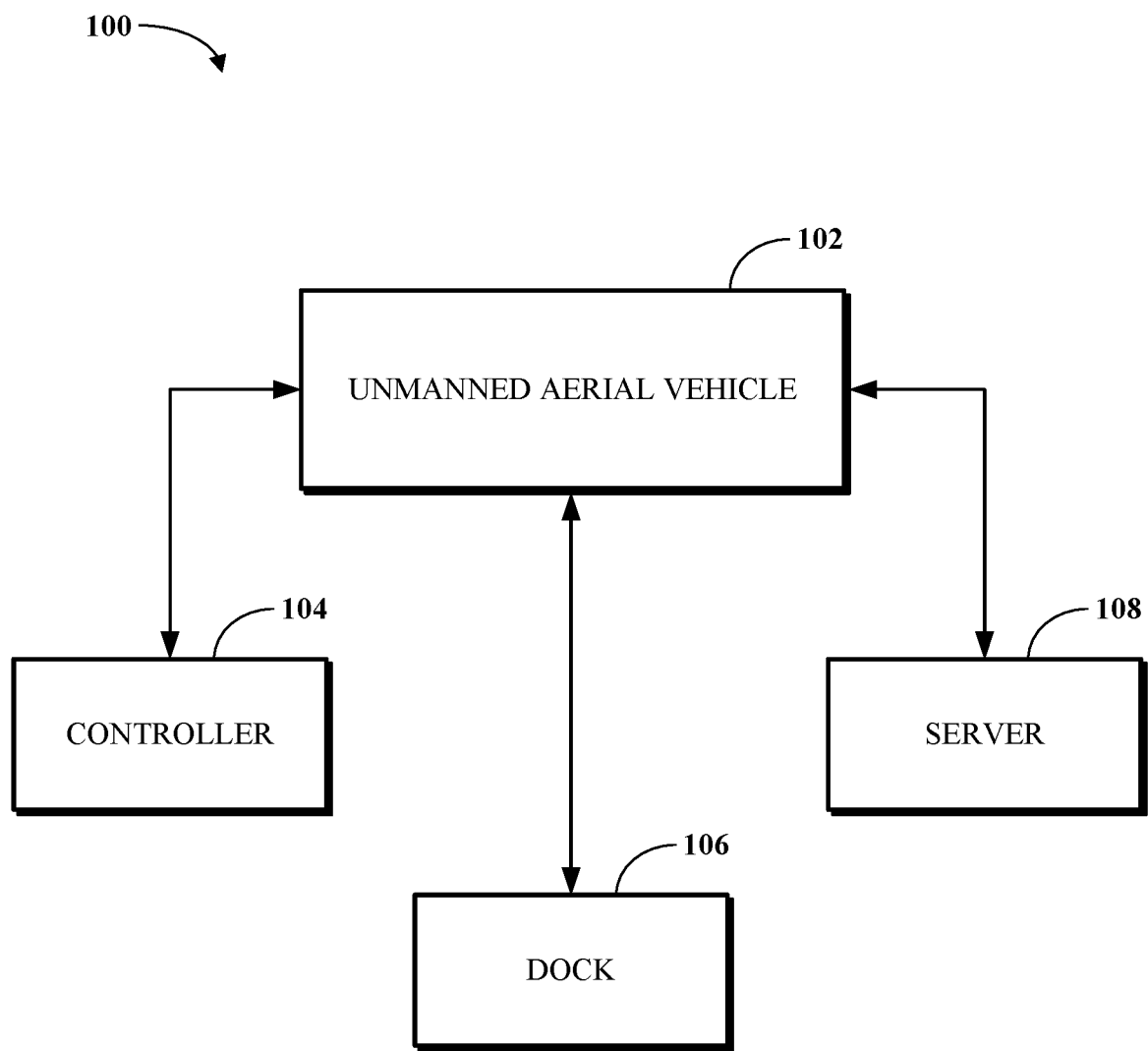
FIG. 1 is an illustration of an example of a UAV system.

A UAV is an aircraft without any human pilot, crew, or passengers on board. Typically, the UAV is controlled by a human using a ground-based controller. However, in some situations, the UAV may lose its connection to the ground-based controller. In such a situation, the UAV may need to automatically navigate itself to a location from which the UAV is capable of communication with the ground-based controller, such as along a predetermined path. Alternatively, the human using the ground base controller may desire for the UAV to return to its launch point, but not be concerned with the exact path that the UAV takes to reach the launch point. In other cases, the UAV may determine that its battery power is below a threshold level and may automatically return to its launch point to recharge and ensure a safe landing independent of communications from the ground-based controller or after communicating to the ground-based controller that the UAV is to return to its launch point due to low battery power.

Techniques for automatic path determination and automatic navigation of the UAV may be desirable to allow the UAV to automatically return to its launch point or its previous location in situations such as those described above. The launch point of the UAV may correspond to a location of a dock or other base station of the UAV. The dock or base station may include a protective enclosure from which the UAV is launched and may include wiring or computational resources for charging a battery of the UAV, updating software of the UAV, or the like.

To address such techniques, according to some implementations of this disclosure, a UAV includes an electromechanical subsystem and a flight control subsystem. The electromechanical subsystem controls electromechanics of the UAV to fly the UAV. For example, the electromechanical subsystem includes the motor, propellers, and the like. The flight control subsystem may be an on-board computer with processing circuitry and a memory. The electromechanical subsystem flies the UAV as directed by the flight control subsystem.

The flight control subsystem generates dense maps during flight. Multiple dense maps may be generated during a flight, with each dense map covering a relatively small region (e.g., a cubic meter). Each of the dense maps represents a portion of a flight path (within the region of space covered by the dense map) and locations of physical objects in a three-dimensional (3D) space through which the UAV travelled. Multiple dense maps may, together, represent the entire flight path or a portion of the flight path. The flight control subsystem generates a global graph based on the dense maps and a sparse map. The flight control subsystem receives a trigger to move the UAV to a position in the 3D space. The flight control subsystem determines a path to the position that avoids the physical objects using the global graph in response to the trigger. The flight control subsystem autonomously navigates the UAV to the position using the determined path. The dense maps, the sparse map, and the global graph may be data structures stored in the memory of the flight control subsystem.

The dense maps store locations of physical objects in the 3D space through which the UAV travelled at a high resolution. In some examples, the dense maps are implemented as a 3D matrix with each cell in the matrix representing one cubic centimeter (or some other size) and indicating whether that cubic centimeter includes a physical object. The dense maps also store a representation of the flight path of the UAV and, in some cases, other UAVs. The dense maps could be used to determine whether the UAV is capable of traveling, in a straight line, from point A to point B without hitting a physical object. Each dense map may be associated with a relatively small area of 3D space (e.g., a cubic meter).

The sparse map stores locations of physical objects in the 3D space through which the UAV travelled at a lower resolution than the dense maps. In some examples, the sparse map is implemented as a 3D matrix with each cell in the matrix representing a 10 centimeter×10 centimeter×10 centimeter cube and indicating whether that cube includes a physical object. In some examples, the sparse map includes a list of points in space and connections between those points. Using telemetry data such as the UAV's position derived from state estimation, the sparse map is generated. Unlike the dense map, the sparse map stores only location of points in space as "nodes", and places "edges" between them, which may encode information such as traversability (e.g., whether the UAV is able to move from a location in 3D space associated with a first node to a location in 3D space associated with a second node), in which traversability information has memory requirements that scale favorably with travel distance compared to dense maps. This means that a single sparse map can span a very large distance (tens or hundreds of kilometers). In some implementations, the disclosed techniques combine dense maps and sparse maps to capture long-range traversability information while preserving the ability to query the local geometry stored in the dense maps. The sparse map may represent a larger area (e.g., a 100 km×100 km×300 m region) or an unlimited area (e.g., the entire Earth). The sparse map may be used, by the flight control subsystem, for path planning over a longer distance. The sparse map and the dense maps may be generated by the UAV (or other UAVs that communicate with the UAV) flying through the 3D space and observing (e.g., using an on-board computer vision, camera, radar, or lidar system) the locations of the physical objects in the 3D space.

The global graph is represented in the memory of the flight control subsystem as a graph with nodes and edges. Each node represents a location in the 3D space through which the UAV travelled (e.g., a cell from the dense maps or the sparse map). An edge between two nodes may indicate, for example, that the UAV can travel without hitting physical objects in an unobstructed straight line between the two nodes. The edge between the two nodes may indicate whether the UAV actually travelled between the two nodes in a previous flight, whether a user manually connected the two nodes (e.g., to indicate that the path between them may be traversed), and/or whether the two nodes are connected by other information derived from camera images or user input.

The trigger may be any event or signal that causes the UAV to move itself to the position in the 3D space. The position may be indicated in the trigger (e.g., by a signal from a human user for the UAV to return to its launch point dock) or may be determined based on the trigger (e.g., where the UAV determines that it has lost connection (or communication) with the controller and returns to a location where it had the connection). In some implementations, the trigger is a request to return to a launch point (or dock associated with the UAV), and the position corresponds to the launch point. In some implementations, the trigger is a battery charge level falling below a battery charge threshold, and the position corresponds to the launch point. The battery charge threshold may be fixed (e.g., 10% of maximum charge) or may vary based on the distance of the UAV from the launch point. The distance of the UAV from the launch point, and the corresponding battery charge threshold, may be determined using the global graph.

Some implementations are described herein as being performed via a UAV. However, alternative implementations may be performed at an aerial vehicle that is not a UAV. The techniques disclosed herein are not limited to being implemented at UAVs only. The techniques are described herein as being implemented at a flight control subsystem onboard a UAV. However, in alternative implementations, the techniques may be implemented remotely at a user device or a server that communicates with the UAV.

Some implementations disclosed herein include various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

To describe some implementations in greater detail, reference is first made to examples of hardware and software structures used to implement path determination for a UAV. FIG. 1 is an illustration of an example of a UAV system 100. The system 100 includes a UAV 102, a controller 104, a dock 106, and a server 108.

The UAV 102 is a vehicle which may be controlled autonomously by one or more onboard processing aspects or remotely controlled by an operator, for example, using the controller 104. The UAV 102 may be implemented as one of a number of types of unmanned vehicle configured for aerial operation. For example, the UAV 102 may be a vehicle commonly referred to as a drone, but may otherwise be an aircraft configured for flight within a human operator present therein. In particular, the UAV 102 may be a multi-rotor vehicle. For example, the UAV 102 may be lifted and propelled by four fixed-pitch rotors in which positional adjustments in-flight may be achieved by varying the angular velocity of each of those rotors.

The controller 104 is a device configured to control at least some operations associated with the UAV 102. The controller 104 may communicate with the UAV 102 via a wireless communications link (e.g., via a Wi-Fi network, a Bluetooth link, a ZigBee link, or another network or link) to receive video or images and/or to issue commands (e.g., take off, land, follow, manual controls, and/or commands related to conducting an autonomous or semi-autonomous navigation of the UAV 102). The controller 104 may be or include a specialized device. Alternatively, the controller 104 may be or includes a mobile device, for example, a smartphone, tablet, laptop, or other device capable of running software configured to communicate with and at least partially control the UAV 102.

The dock 106 is a structure which may be used for takeoff and/or landing operations of the UAV 102. In particular, the dock 106 may include one or more fiducials usable by the UAV 102 for autonomous takeoff and landing operations. For example, the fiducials may generally include markings which may be detected using one or more sensors of the UAV 102 to guide the UAV 102 from or to a specific position on or in the dock 106. In some implementations, the dock 106 may further include components for charging a battery of the UAV 102 while the UAV 102 is on or in the dock 106. The dock 106 may be a protective enclosure from which the UAV 102 is launched. A location of the dock 106 may correspond to the launch point of the UAV 102.

The server 108 is a remote computing device from which information usable for operation of the UAV 102 may be received and/or to which information obtained at the UAV 102 may be transmitted. For example, the server 108 may be used to train a learning model usable by one or more aspects of the UAV 102 to implement functionality of the UAV 102. In another example, signals including information usable for updating aspects of the UAV 102 may be received from the server 108. The server 108 may communicate with the UAV 102 over a network, for example, the Internet, a local area network, a wide area network, or another public or private network.

In some implementations, the system 100 may include one or more additional components not shown in FIG. 1. In some implementations, one or more components shown in FIG. 1 may be omitted from the system 100, for example, the server 108.

Figure 2A:
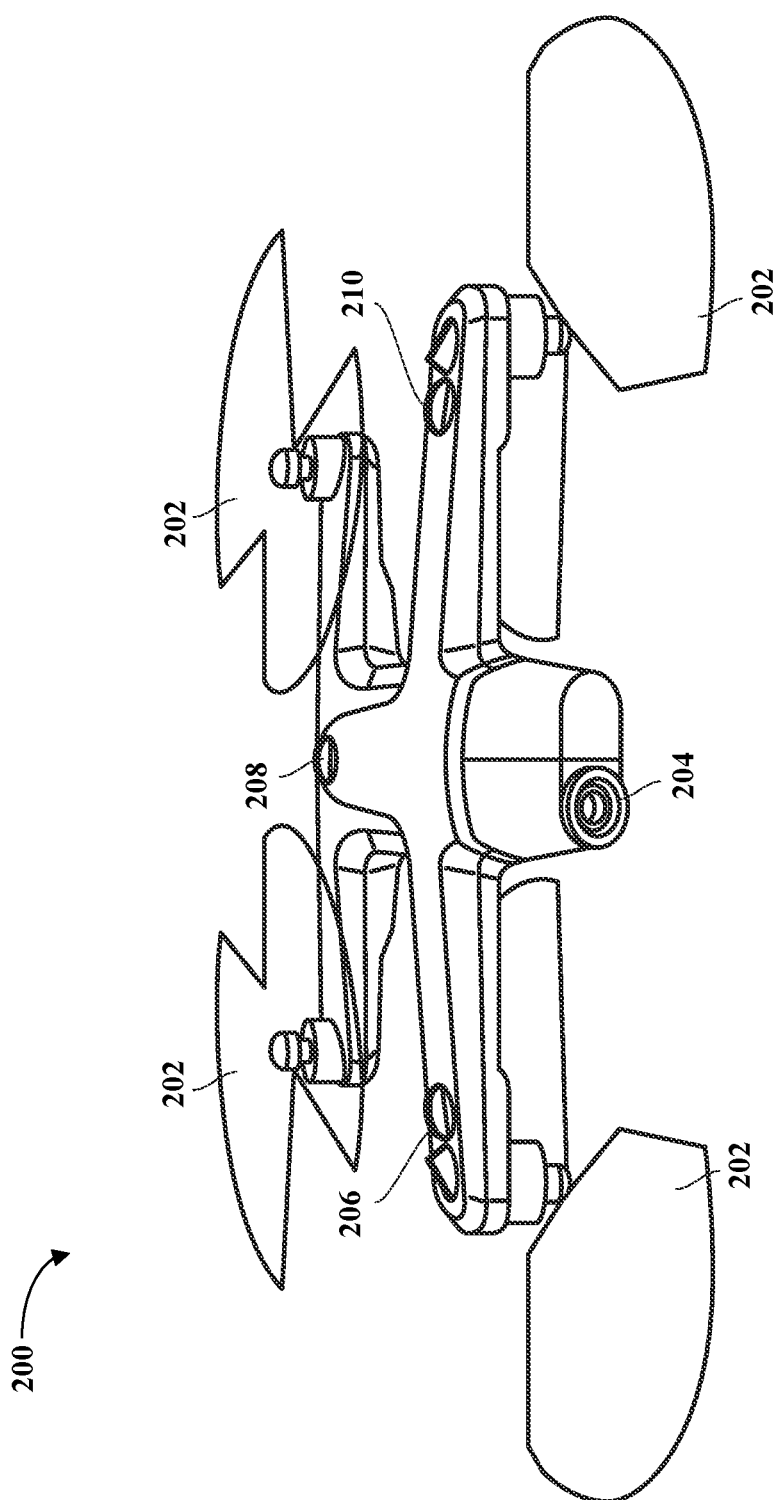
FIG. 2A is an illustration of an example of a UAV as seen from above.
Figure 2B:
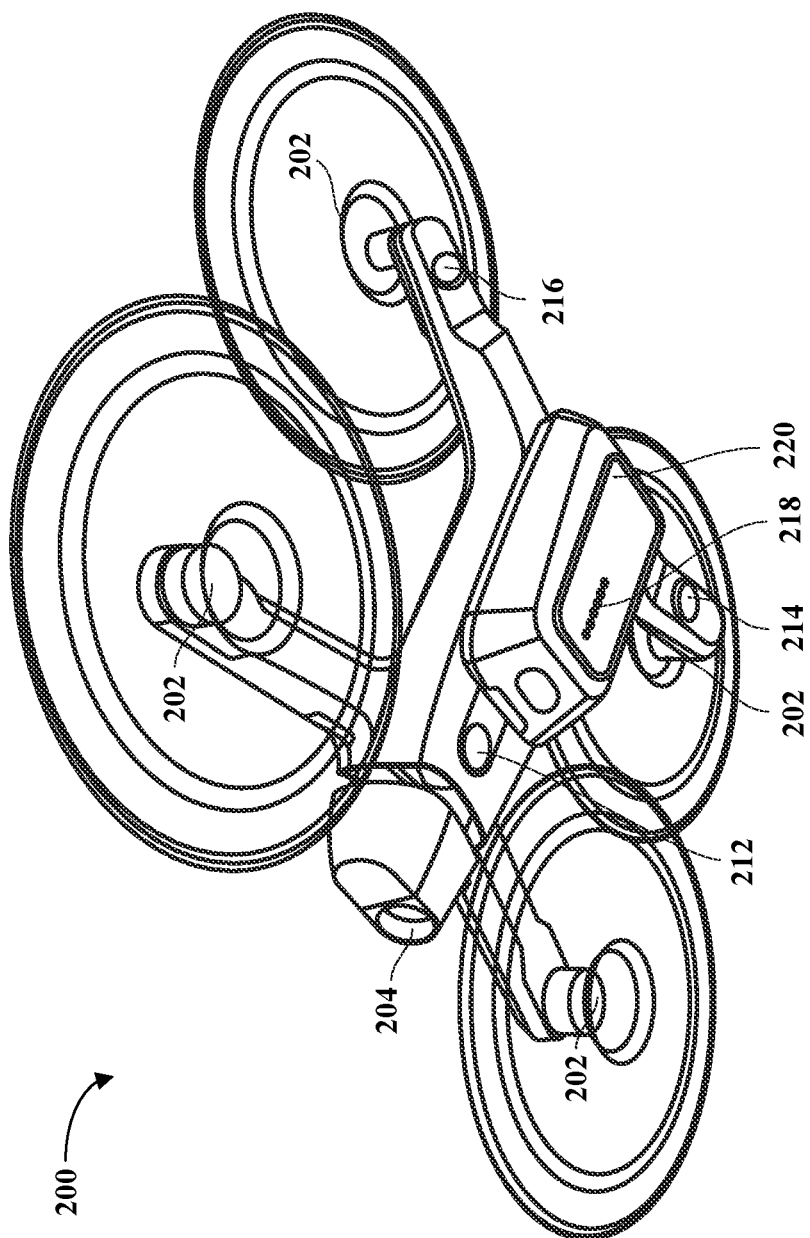
FIG. 2B is an illustration of an example of a UAV as seen from below.

An example illustration of a UAV 200, which may, for example, be the UAV 102 shown in FIG. 1, is shown in FIGS. 2A-B. FIG. 2A is an illustration of an example of the UAV 200 as seen from above. The UAV 200 includes a propulsion mechanism 202 including some number of propellers (e.g., four) and motors configured to spin the propellers. For example, the UAV 200 may be a quad-copter drone. The UAV 200 includes image sensors, including a high-resolution image sensor 204. This image sensor 204 may, for example, be mounted on a gimbal to support steady, low-blur image capture and object tracking. The UAV 200 also includes image sensors 206, 208, and 210 that are spaced out around the top of the UAV 200 and covered by respective fisheye lenses to provide a wide field of view and support stereoscopic computer vision. The image sensors 206, 208, and 210 generally have a resolution which is lower than a resolution of the image sensor 204. The UAV 200 also includes other internal hardware, for example, a processing apparatus (not shown). In some implementations, the processing apparatus is configured to automatically fold the propellers when entering a dock (e.g., the dock 106 shown FIG. 1), which may allow the dock to have a smaller footprint than the area swept out by the propellers of the propulsion mechanism 202.

FIG. 2B is an illustration of an example of the UAV 200 as seen from below. From this perspective, three more image sensors 212, 214, and 216 arranged on the bottom of the UAV 200 may be seen. These image sensors 212, 214, and 216 may also be covered by respective fisheye lenses to provide a generally wide field of view and support stereoscopic computer vision. The various image sensors of the UAV 200 may enable visual inertial odometry (VIO) for high resolution localization and obstacle detection and avoidance. For example, the image sensors may be used to capture images including infrared data which may be processed for day or night mode navigation of the UAV 200. The UAV 200 also includes a battery in battery pack 220 attached on the bottom of the UAV 200, with conducting contacts 218 to enable battery charging. The bottom surface of the battery pack 220 may be a bottom surface of the UAV 200.

Figure 3:
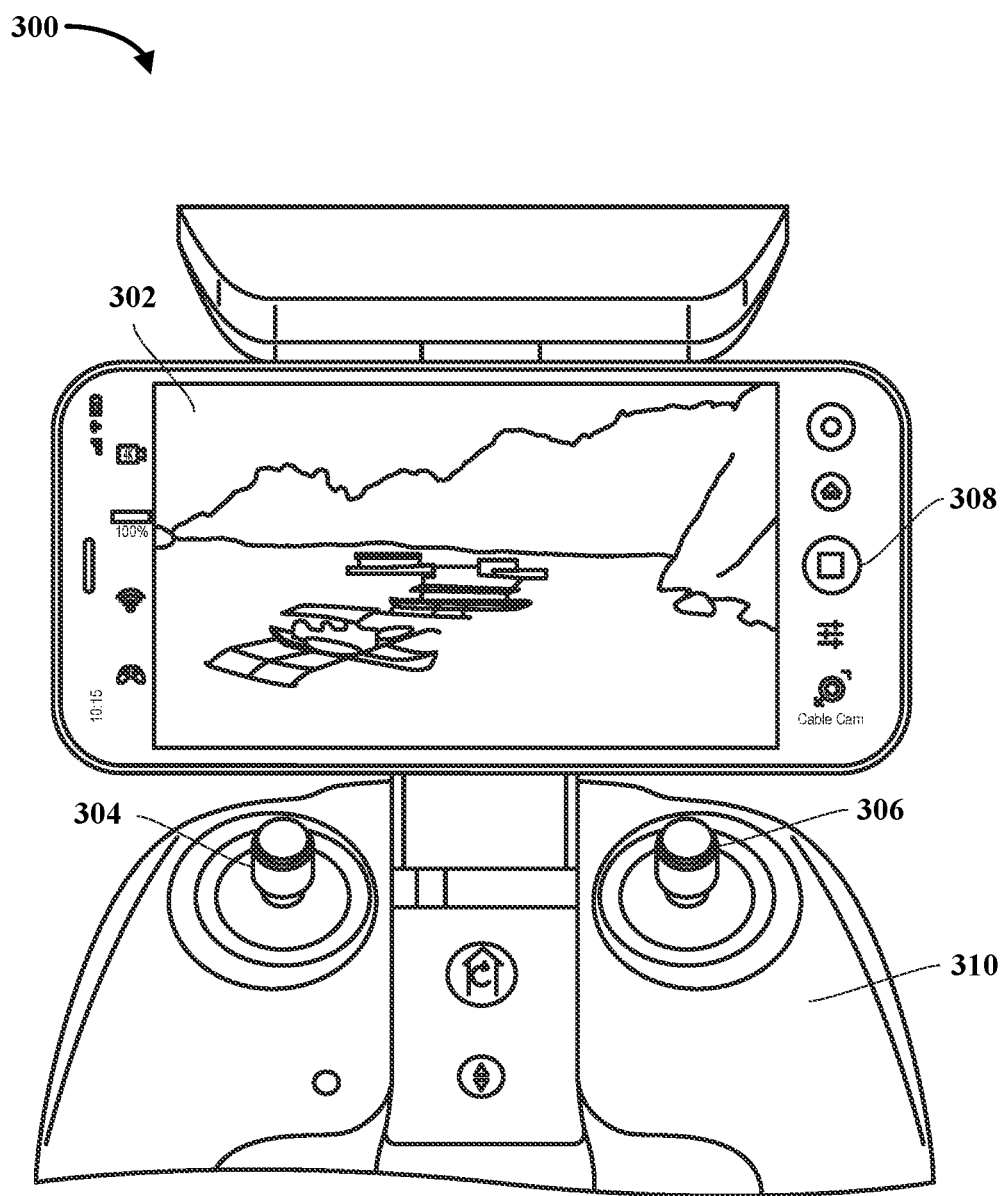
FIG. 3 is an illustration of an example of a controller for a UAV.

FIG. 3 is an illustration of an example of a controller 300 for a UAV, which may, for example, be the UAV 102 shown in FIG. 1. The controller 300 may, for example, be the controller 104 shown in FIG. 1. The controller 300 may provide a user interface for controlling the UAV and reviewing data (e.g., images) received from the UAV. The controller 300 includes a touchscreen 302, a left joystick 304, and a right joystick 306. In the example as shown, the touchscreen 302 is part of a mobile device 308 (e.g., a smartphone) that connects to a controller attachment 310, which, in addition to providing addition control surfaces including the left joystick 304 and the right joystick 306, may provide range extending communication capabilities for longer distance communication with the UAV.

Figure 4:
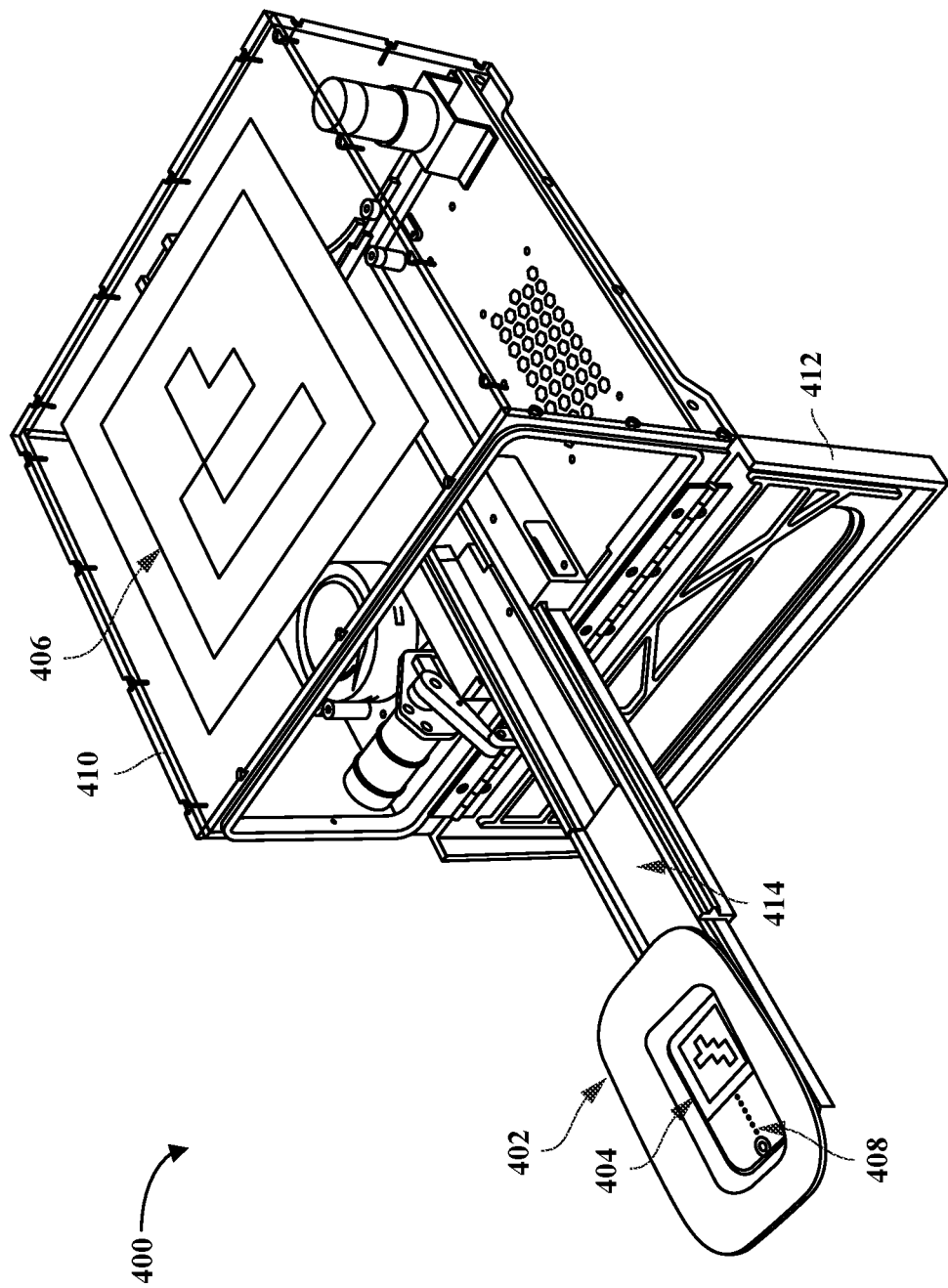
FIG. 4 is an illustration of an example of a dock for facilitating autonomous landing of a UAV.

FIG. 4 is an illustration of an example of a dock 400 for facilitating autonomous landing of a UAV, for example, the UAV 102 shown in FIG. 1. The dock 400 may, for example, be the dock 106 shown in FIG. 1. The dock 400 may be a base station. The dock 400 includes a landing surface 402 with a fiducial 404, charging contacts 408 for a battery charger, a box 410 in the shape of a rectangular box with a door 412, and a retractable arm 414.

The landing surface 402 is configured to hold a UAV. The UAV may be configured for autonomous landing on the landing surface 402. The landing surface 402 has a funnel geometry shaped to fit a bottom surface of the UAV at a base of the funnel. The tapered sides of the funnel may help to mechanically guide the bottom surface of the UAV into a centered position over the base of the funnel during a landing. For example, corners at the base of the funnel may server to prevent the aerial vehicle from rotating on the landing surface 402 after the bottom surface of the aerial vehicle has settled into the base of the funnel shape of the landing surface 402. For example, the fiducial 404 may include an asymmetric pattern that enables robust detection and determination of a pose (i.e., a position and an orientation) of the fiducial 404 relative to the UAV based on an image of the fiducial 404, for example, captured with an image sensor of the UAV.

The conducting contacts 408 are contacts of a battery charger on the landing surface 402, positioned at the bottom of the funnel. The dock 400 includes a charger configured to charge a battery of the UAV while the UAV is on the landing surface 402. For example, a battery pack of the UAV (e.g., the battery pack 220 shown in FIG. 2) may be shaped to fit on the landing surface 402 at the bottom of the funnel shape. As the UAV makes its final approach to the landing surface 402, the bottom of the battery pack will contact the landing surface and be mechanically guided by the tapered sides of the funnel to a centered location at the bottom of the funnel. When the landing is complete, the conducting contacts of the battery pack may come into contact with the conducting contacts 408 on the landing surface 402, making electrical connections to enable charging of the battery of the UAV. The dock 400 may include a charger configured to charge the battery while the UAV is on the landing surface 402.

The box 410 is configured to enclose the landing surface 402 in a first arrangement and expose the landing surface 402 in a second arrangement. The dock 400 may be configured to transition from the first arrangement to the second arrangement automatically by performing steps including opening the door 412 of the box 410 and extending the retractable arm 414 to move the landing surface 402 from inside the box 410 to outside of the box 410.

The landing surface 402 is positioned at an end of the retractable arm [412] 414. When the retractable arm 414 is extended, the landing surface 402 is positioned away from the box 408 of the dock 400, which may reduce or prevent propeller wash from the propellers of a UAV during a landing, thus simplifying the landing operation. The retractable arm 414 may include aerodynamic cowling for redirecting propeller wash to further mitigate the problems of propeller wash during landing. The retractable arm 414 supports the landing surface 402 and enables the landing surface 402 to be positioned outside the box 410, to facilitate takeoff and landing of a UAV, or inside the box 410, for storage and/or servicing of a UAV.

In some implementations, the dock 400 includes a second, auxiliary fiducial 406 on an outer surface of the box 410. The root fiducial 404 and the auxiliary fiducial 406 may be detected and used for visual localization of the UAV in relation the dock 400 to enable a precise landing on a small landing surface 402. For example, the fiducial 404 may be a root fiducial, and the auxiliary fiducial 406 is larger than the root fiducial 404 to facilitate visual localization from farther distances as a UAV approaches the dock 400. For example, the area of the auxiliary fiducial 406 may be 25 times the area of the root fiducial 404. For example, the auxiliary fiducial 406 may include an asymmetric pattern that enables robust detection and determination of a pose (i.e., a position and an orientation) of the auxiliary fiducial 406 relative to the UAV based on an image of the auxiliary fiducial 406 captured with an image sensor of the UAV.

Figure 5:
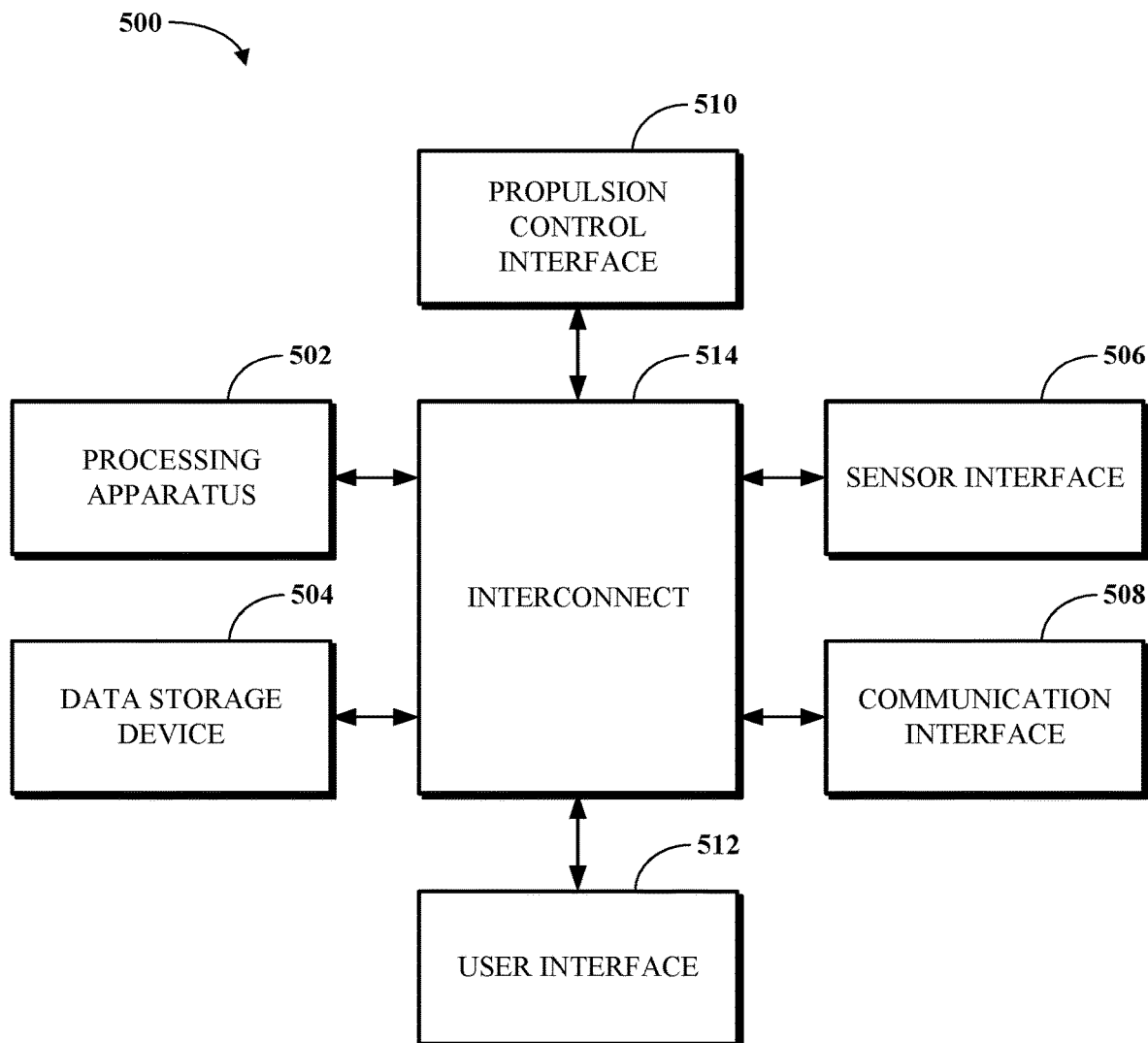
FIG. 5 is a block diagram of an example of a hardware configuration of a UAV.

FIG. 5 is a block diagram of an example of a hardware configuration of a UAV 500, which may, for example, be the UAV 102 shown in FIG. 1. The UAV 500 includes a processing apparatus 502, a data storage device 504, a sensor interface 506, a communications interface 508, propulsion control interface 510, a user interface 512, and an interconnect 514 through which the processing apparatus 502 may access the other components.

The processing apparatus 502 is operable to execute instructions that have been stored in the data storage device 504 or elsewhere. The processing apparatus 502 is a processor with random access memory (RAM) for temporarily storing instructions read from the data storage device 504 or elsewhere while the instructions are being executed. The processing apparatus 502 may include a single processor or multiple processors each having single or multiple processing cores. Alternatively, the processing apparatus 502 may include another type of device, or multiple devices, capable of manipulating or processing data. The processing apparatus 502 may be arranged into processing unit, such as a central processing unit (CPU) or a graphics processing unit (GPU).

The data storage device 504 is a non-volatile information storage device, for example, a solid-state drive, a read-only memory device (ROM), an optical disc, a magnetic disc, or another suitable type of storage device such as a non-transitory computer readable memory. The data storage device 504 may include another type of device, or multiple devices, capable of storing data for retrieval or processing by the processing apparatus 502. The processing apparatus 502 may access and manipulate data stored in the data storage device 504 via the interconnect 514, which may, for example, be a bus or a wired or wireless network (e.g., a vehicle area network).

The sensor interface 506 is configured to control and/or receive data from one or more sensors of the UAV 500. The data may refer, for example, to one or more of temperature measurements, pressure measurements, a global positioning system (GPS) data, acceleration measurements, angular rate measurements, magnetic flux measurements, a visible spectrum image, an infrared image, an image including infrared data and visible spectrum data, and/or other sensor output. For example, the one or more sensors from which the data is generated may include single or multiple of one or more of an image sensor, an accelerometer, a gyroscope, a geolocation sensor, a barometer, and/or another sensor. In some implementations, the sensor interface 506 may implement a serial port protocol (e.g., I2C or SPI) for communications with one or more sensor devices over conductors. In some implementations, the sensor interface 506 may include a wireless interface for communicating with one or more sensor groups via low-power, short-range communications techniques (e.g., using a vehicle area network protocol).

The communications interface 508 facilitates communication with one or more other devices, for example, a paired dock (e.g., the dock 106), a controller (e.g., the controller 104), or another device, for example, a user computing device (e.g., a smartphone, tablet, or other device). The communications interface 508 may include a wireless interface and/or a wired interface. For example, the wireless interface may facilitate communication via a Wi-Fi network, a Bluetooth link, a ZigBee link, or another network or link. In another example, the wired interface may facilitate communication via a serial port (e.g., RS-232 or USB). The communications interface 508 further facilitates communication via a network, which may, for example, be the Internet, a local area network, a wide area network, or another public or private network.

The propulsion control interface 510 is used by the processing apparatus to control a propulsion system of the UAV 500 (e.g., including one or more propellers driven by electric motors). For example, the propulsion control interface 510 may include circuitry for converting digital control signals from the processing apparatus 502 to analog control signals for actuators (e.g., electric motors driving respective propellers). In some implementations, the propulsion control interface 510 may implement a serial port protocol (e.g., I2C or SPI) for communications with the processing apparatus 502. In some implementations, the propulsion control interface 510 may include a wireless interface for communicating with one or more motors via low-power, short-range communications (e.g., a vehicle area network protocol).

The user interface 512 allows input and output of information from/to a user. In some implementations, the user interface 512 can include a display, which can be a liquid crystal display (LCD), a light emitting diode (LED) display (e.g., an OLED display), or another suitable display. In some such implementations, the user interface 512 may be or include a touchscreen. In some implementations, the user interface 512 may include one or more buttons. In some implementations, the user interface 512 may include a positional input device, such as a touchpad, touchscreen, or the like, or another suitable human or machine interface device.

In some implementations, the UAV 500 may include one or more additional components not shown in FIG. 5. In some implementations, one or more components shown in FIG. 5 may be omitted from the UAV 500, for example, the user interface 512.

Figure 6:
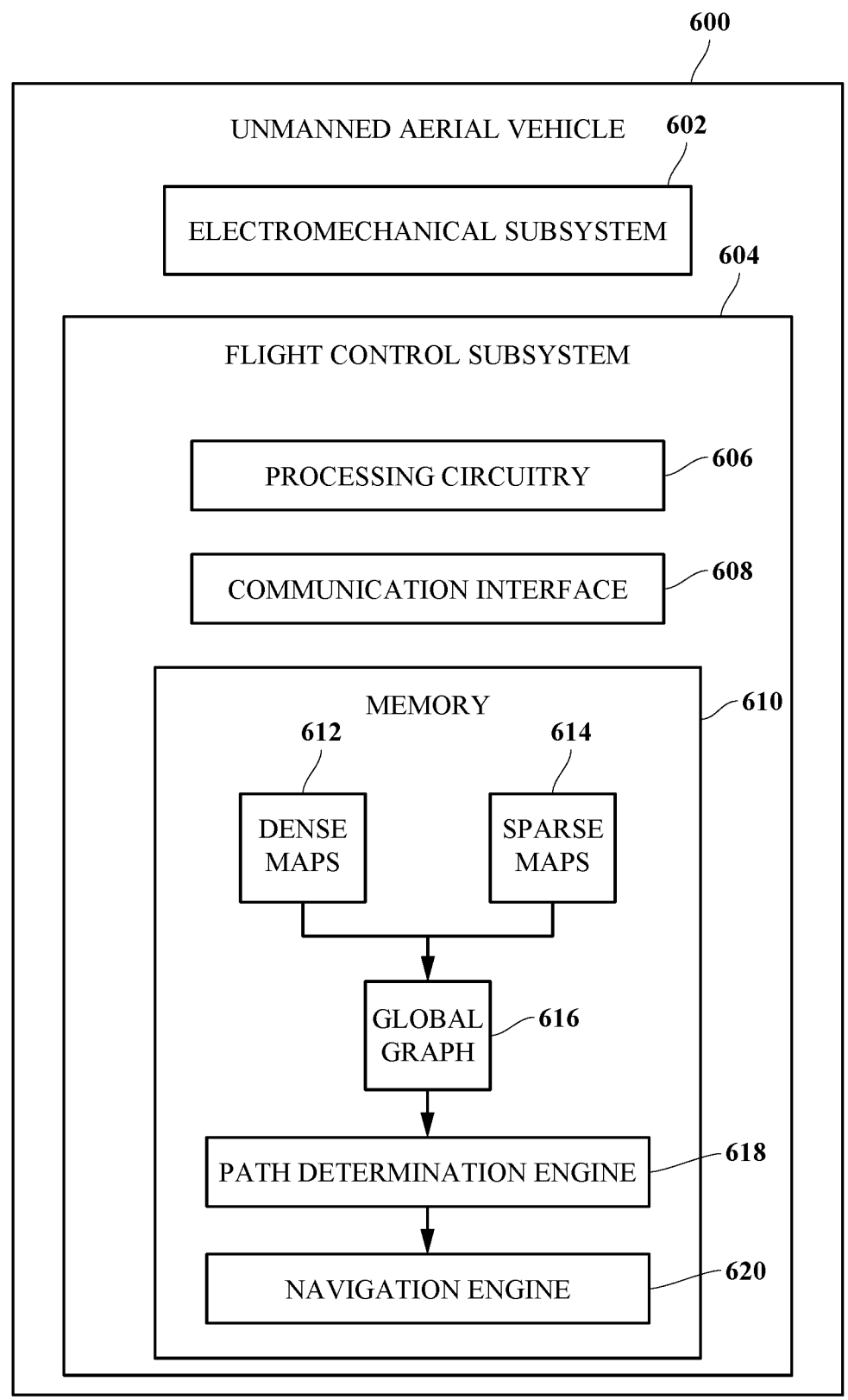
FIG. 6 is a block diagram of an example UAV.

FIG. 6 is a block diagram of an example UAV 600. The UAV 600 may correspond to the UAV 500 or the UAV 102 or may otherwise include all or a portion of the components of the UAV 500 or the UAV 102. As shown, the UAV 600 includes an electromechanical subsystem 602 and a flight control subsystem 604. The electromechanical subsystem 602 includes propellers and electric motors for driving the propellers. The electromechanical subsystem 602 flies the UAV 600.

The flight control subsystem 604 directs the electromechanical subsystem 602 to fly the UAV 600. The flight control subsystem 604 determines a path for the UAV 600 to fly and navigates the UAV 600 according to the path by transmitting instructions to the electromechanical subsystem 602. The instructions may be transmitted over an interconnect (e.g., the interconnect 514). As shown, the flight control subsystem 604 includes processing circuitry 606, a communication interface 608, and a memory 610. The processing circuitry 606 includes one or more processors. Each processor may include RAM for temporarily storing instructions read from the memory 610 or elsewhere while the instructions are being executed. Each processor may include a single or multiple processing cores. Alternatively, the processing circuitry 606 may include another type of device, or multiple devices, capable of manipulating or processing data. The processing circuitry 606 may be arranged into processing units, such as a CPU or a GPU. The processing circuitry 606 may correspond to the processing apparatus 502. The communication interface 608 transmits and receives communications from external devices, such as the controller 104, the dock 106, or the server 108. The communication interface 608 may correspond to the communication interface 508. The memory 610 stores data or instructions. The memory 610 may be a non-transitory computer-readable medium. The memory may include at least one of a solid-state drive, a ROM, an optical disc, a magnetic disc, or another suitable type of storage device. The memory 610 may correspond to the data storage device 504. As shown, the memory 610 stores dense maps 612, a sparse map 614, a global graph 616, a path determination engine 618, and a navigation engine 620.

The dense maps 612 are generated during flight of the UAV 600 (or another UAV). (In alternative implementations, the dense maps 612 may be generated after a flight (or multiple flights) based on data obtained during the flight (or the multiple flights).) The dense maps 612 represent a flight path and locations of physical objects in a 3D space. The dense maps 612 store locations of physical objects in the 3D space at a high resolution. In some examples, the dense maps 612 are implemented as a 3D matrix with each cell in the matrix representing one cubic centimeter and indicating whether that cubic centimeter includes a physical object. Each dense map may be associated with a relatively small area of 3D space, for example, one cubic meter or any rectangular prism (e.g., with edge length of 1-50 meters). The dense maps 612 may store dense, local geometry information (e.g., truncated signed distance function (TSDF), voxels, range images, or the like). The dense maps 612 may incorporate a hierarchical sub-map structure for efficient geometric planning.

The sparse map 614 stores locations of physical objects in the 3D space at a lower resolution than the dense maps. The sparse map 614 may represent a larger area (e.g., a 100 km×100 km×300 m region) or a global sparse map (representing all relevant areas) may be used. The sparse map 614 may be used, by the flight control subsystem 604, for path planning over a longer distance. Similar to the dense maps 612, the sparse map 614 are generated by the UAV (or other UAVs that communicate with the UAV) during flight through the 3D space by observing (e.g., using an on-board computer vision, camera, radar, or lidar system) the locations of the physical objects in the 3D space.

As shown, the flight control subsystem 604 generates the global graph 616 based on the dense maps 612 and the sparse map 614. The global graph 616 is represented, in the memory 610, as a graph with nodes and edges. Each node represents a location in the 3D space, such as a cell in the dense maps 612 or the sparse map 614. An edge between two nodes indicates that the UAV 600 can travel in a straight line between the two nodes without hitting any physical objects. Some implementations may provide a framework for graph algorithms to run on the global graph 616. The graph algorithms may operate over multiple cycles to spread out computation for complex, low frequency tasks. The global graph 616 may be associated with an application programming interface (API) to pre-annotate edges on the global graph for traversal based on user configuration. Algorithms may be defined, via the API, to utilize only certain sub-sets of edge types. Some example use cases may include: long, drift-free indoor patrol missions; large scale exploration and next-best-view planning algorithms; large scale scanning; and multi-UAV collaboration in a fixed environment. In some implementations, each node in the global graph 616 may be associated with a time when the node was traversed and a probability that the node lacks physical objects (e.g., based on the time when the node was traversed—for example, a node traversed 10 seconds ago may have a lower probability of having a physical object therein than a node traversed 10 days ago). Each edge in the global graph 616 may be associated with a probability that the edge is still traversable based on a time when the edge was traversed or a time when each node at an endpoint of the edge was last visited.

The path determination engine 618 determines a path from an origin point (e.g., a current location of the UAV 600) to a destination point (e.g., a location of the dock 106 or a location from which the UAV 600 was previously capable of communication with the controller 104) that avoids the physical objects using the global graph 616. The navigation engine 620 autonomously navigates the UAV 600 to the position using the determined path. For example, the navigation engine 620 generates instructions that are provided to the electromechanical subsystem 602 to move the UAV 600 from the origin point to the destination point. In some implementations, the path determination engine 618 and/or the navigation engine 620 coalesce an API for publishing of estimated return to launch point (RTX) and provide an interface for building and testing complex, nuanced RTX behavior. The launch point may correspond to a home location, a mobile phone location (e.g., of a mobile phone used to control the UAV), a takeoff location, or a dock location.

Some example use cases relate to security patrols. Graph planning, associated with the global graph 616, allows the UAV 600 to return to the launch point if the battery of the UAV 600 falls below a threshold charge level or if the patrol path becomes obstructed, too dim for flight, or otherwise becomes untraversable (detected via lack of progress made towards a patrol waypoint traversal).

In an event that the battery of the UAV 600 falls below the threshold charge level, according to some schemes, the UAV 600 may attempt to fly in a straight line back to the launch point, and the time estimate may be inconsistent with the actual time it takes to find a path back to the launch point. According to some implementations, the UAV 600 travels back to the launch point based on edges and nodes indicated in the global graph 616.

In an event that the patrol path becomes obstructed, too dim for flight, or otherwise becomes untraversable (detected via lack of progress made towards the patrol waypoint traversal), the UAV 600 may backtrack along a path selected based on edges and nodes in the global graph 616. In some cases, the UAV 600 may backtrack along a path made up of points that the UAV 600 previously traversed.

Some implementations relate to generating the dense maps 612, the sparse map 614, and/or the global graph 616. Some implementations relate to updating odometry drift based on detecting fixed object in the environment and storing the locations of the fixed objects in the memory 610. For example, the UAV may travel through a 3D space while storing the location of the UAV in the 3D (determined via a global positioning system or other technology). The UAV uses radar, lidar, camera images, and/or other technologies to determine positions of fixed objects surrounding the UAV, and stores the positions of those fixed objects in the dense maps 612, the sparse map 614, and/or the global graph 616.

Figure 7:
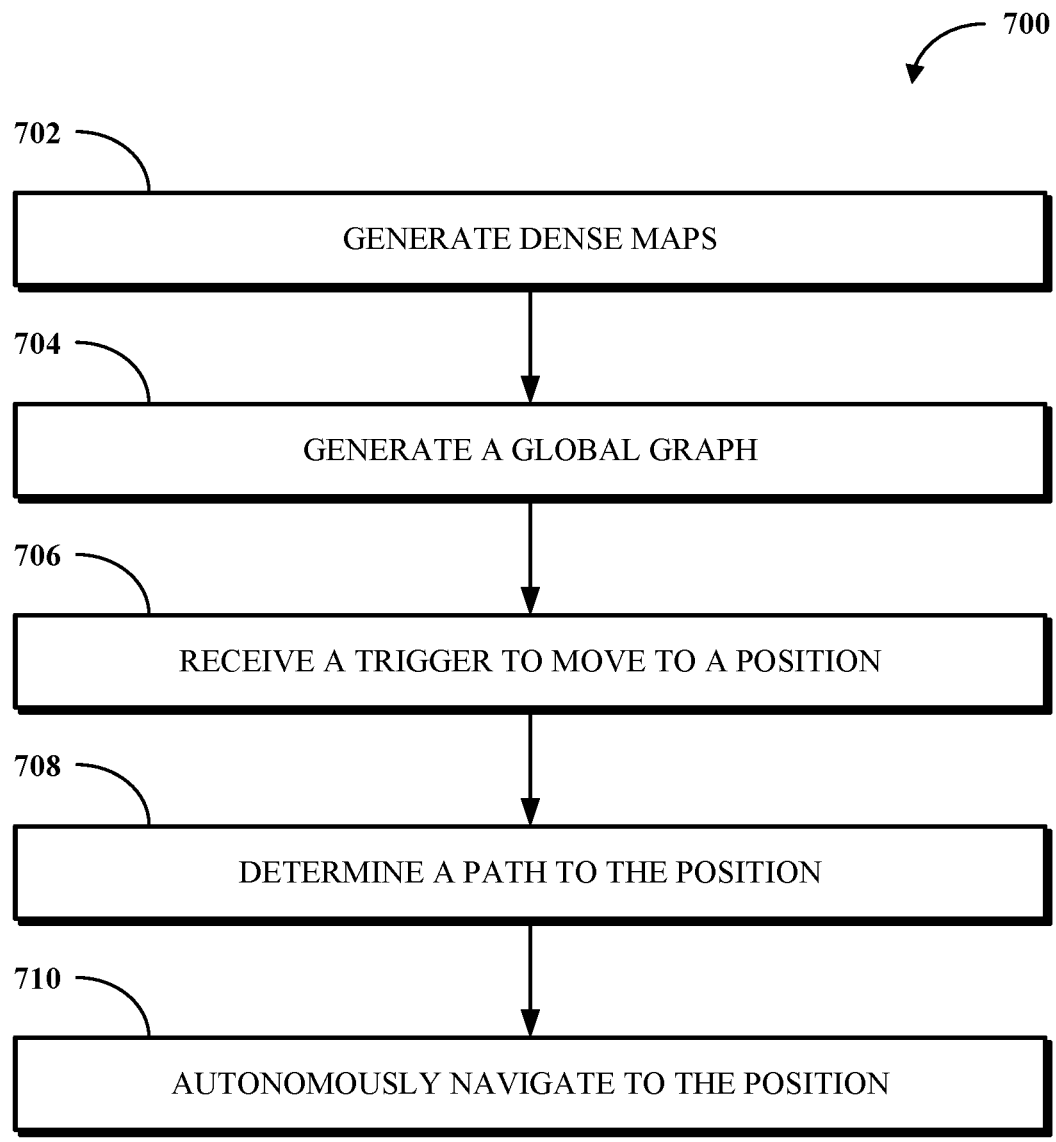
FIG. 7 is a flowchart of an example of a technique for navigation of a UAV.

FIG. 7 is a flowchart of an example of a technique 700 for navigation of a UAV. The technique 700 is described below as being implemented at the UAV 600. However, in alternative implementations, the technique 700 may be implemented at a UAV having a different structure from the UAV 600 or at an aerial vehicle that is not a UAV. In some implementations, the technique 700 is implemented at a computer external to the UAV 600 or other aerial vehicle.

At block 702, the UAV 600 generates the dense maps 612 during flight. The dense maps 612 may represent a flight path and locations of physical objects in a 3D space. The dense map 612 may represent locations of physical objects a part of in the 3D space. According to some implementations, the UAV 600 includes onboard sensors associated with the sensor interface 506) and an onboard location tracker (e.g., an assisted global positioning system (A-GPS)). The onboard sensors may include at least one of an onboard camera system, an onboard radar system, or an onboard lidar system. During flight, the UAV 600 uses the onboard location tracker to track its current location in 3D space. The UAV uses the onboard sensors to detect locations of physical objects proximate to itself. The UAV records the positions of the physical. objects in 3D space in the dense maps 612.

At block 704, the UAV 600 generates the global graph 616 based on the dense maps 612 and the sparse map 614. The sparse map 614 may represent locations of physical objects at a lower resolution than the dense map 612. The global graph 616 may be represented, in the memory 610, as a graph with nodes and edges. Each node corresponds to a location in a 3D space. An edge between two nodes indicates whether the UAV 600 can travel, without hitting physical objects, in an unobstructed straight line between the two nodes. The edge between the two nodes that indicates whether the UAV 600 can travel in the unobstructed straight line between the two nodes may be determined based on one or more of the dense maps 612 or the sparse map 614.

At block 706, the UAV 600 receives a trigger to move the UAV 600 to a position in the 3D space. The trigger may include a request (e.g., by a ground-based human operator of the UAV 600) to return the UAV 600 to a launch point (e.g., located at the dock 106) of the UAV 600, and the position may correspond to the launch point. The trigger may include a battery charge level falling below a battery charge threshold, and the position may correspond to the launch point. The battery charge threshold may be fixed (e.g., 15% of the full battery charge) or variable based on a distance between the launch point and the UAV 600.

At block 708, the UAV 600 determines, using the path determination engine 618, a path to the position that avoids the physical objects using the global graph 616 in response to the trigger. In some implementations, the path determination engine 618 determines the path using the dense maps 612 or the sparse map 614 in addition to the global graph 616. The path determination engine 618 provides all or a portion of the determined path to the navigation engine 620.

At block 710, the UAV 600 autonomously navigates, using the navigation engine 620, the UAV 600 to the position using the determined path. The navigation engine 620 provides navigation instructions to navigate the UAV 600 based on the determined path and sensor data (e.g., received via the sensor interface 506). The sensor data might be used to modify the determined path. The determined path may be modified, for example, if there is a moving object that is obstructing the determined path. The moving object may be detected in the sensor data. The navigation instructions are provided to the electromechanical subsystem 602 to fly the UAV 600 according to the navigation instructions.

Figure 8:
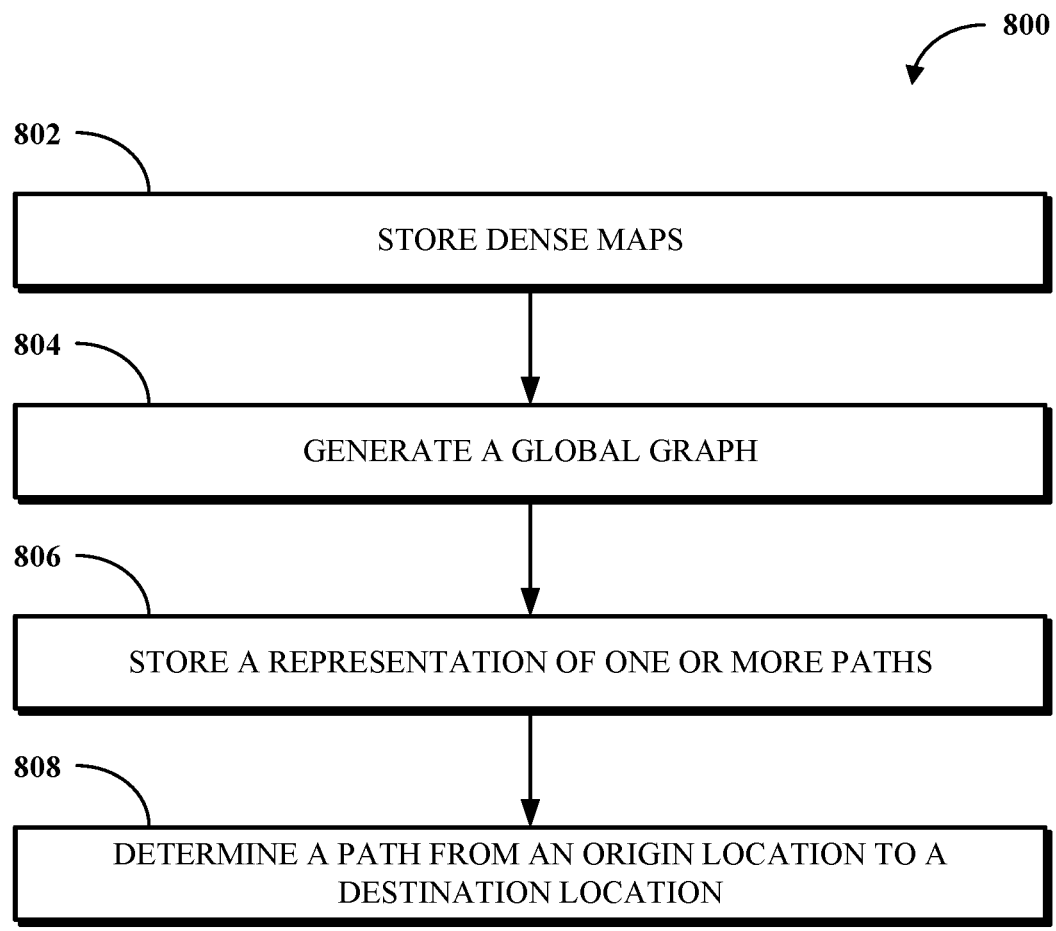
FIG. 8 is a flowchart of an example of a technique for path determination for a UAV.

FIG. 8 is a flowchart of an example of a technique 800 for path determination for a UAV. The technique 800 is described below as being implemented at the UAV 600. However, in alternative implementations, the technique 800 may be implemented at a UAV having a different structure from the UAV 600 or at an aerial vehicle that is not a UAV. In some implementations, the technique 800 is implemented at a computer external to the UAV 600 or other aerial vehicle.

At block 802, the UAV 600 stores the dense maps 612 generated by one or more aerial vehicles during flight, including the UAV 600. The UAV 600 may receive some of the dense maps 612 from other aerial vehicles (e.g., other UAVs or other non-UAV aerial vehicles). In some implementations, when an aerial vehicle, such as the UAV 600, is at its dock or connected to a high-speed network (e.g., a Wi-Fi® network), the aerial vehicle uploads its dense maps to a server and downloads dense maps generated at other aerial vehicles from the server.

At block 804, the UAV 600 generates the global graph 616 based on the dense maps 612 and a sparse map 614. Each of the dense maps 612 includes a set of cells representing physical objects within a rectangular prism in a 3D space.

Each cell is marked as having or lacking a physical object of the physical objects. The global graph 616 includes nodes corresponding to cells and edges between some of the nodes. An edge between two nodes indicates whether a straight-line path between the cells of the two nodes has or lacks physical objects. A node may correspond to single cell or to a group of adjacent cells.

In some implementations, the sparse map 614 is generated based on the dense maps 612. To generate the sparse map 614, the UAV 600 (or a computer external to the UAV 600) reduces a resolution of at least one dense map from the dense maps 612 to generate a reduced resolution map. The UAV 600 (or the computer external to the UAV 600) adds the reduced resolution map to the sparse map 614. The computer external to the UAV 600 may be, for example, an onboard computer of another UAV, the server 108, or a ground control station/user device used to control the UAV 600.

At block 806, the UAV 600 stores a representation of one or more paths traversed by the UAV 600 or other aerial vehicles within the global graph. During flight, the UAV 600 may store data representing the flight paths of the UAV 600. The data representing the flight paths may be uploaded to the server 108 (for provision to other aerial vehicles) when the UAV 600 is at its dock and connected to a high-speed network (e.g., a network with an upload of at least 2 megabits per second).

At block 808, the UAV 600 determines a path from an origin location to a destination location based on the global graph 616. The path may be determined based on the stored data representing the flight paths of the UAV 600 or other aerial vehicles. The origin location may be a current location of the UAV 600 and the destination location may be a location of the launch point or the dock of the UAV 600. The path from the origin location to the destination location may be determined in response to at least one of a user request to return the UAV 600 to the launch point or the dock, a battery power level of the UAV 600 falling below a power threshold, or a brightness of light detected by a sensor at the UAV 600 falling below a brightness threshold. Alternatively, the UAV 600 may be tracking or observing a subject or an object that disappears from view, and the destination location may be a location where the UAV 600 last observed the subject or the object.

Figure 9:
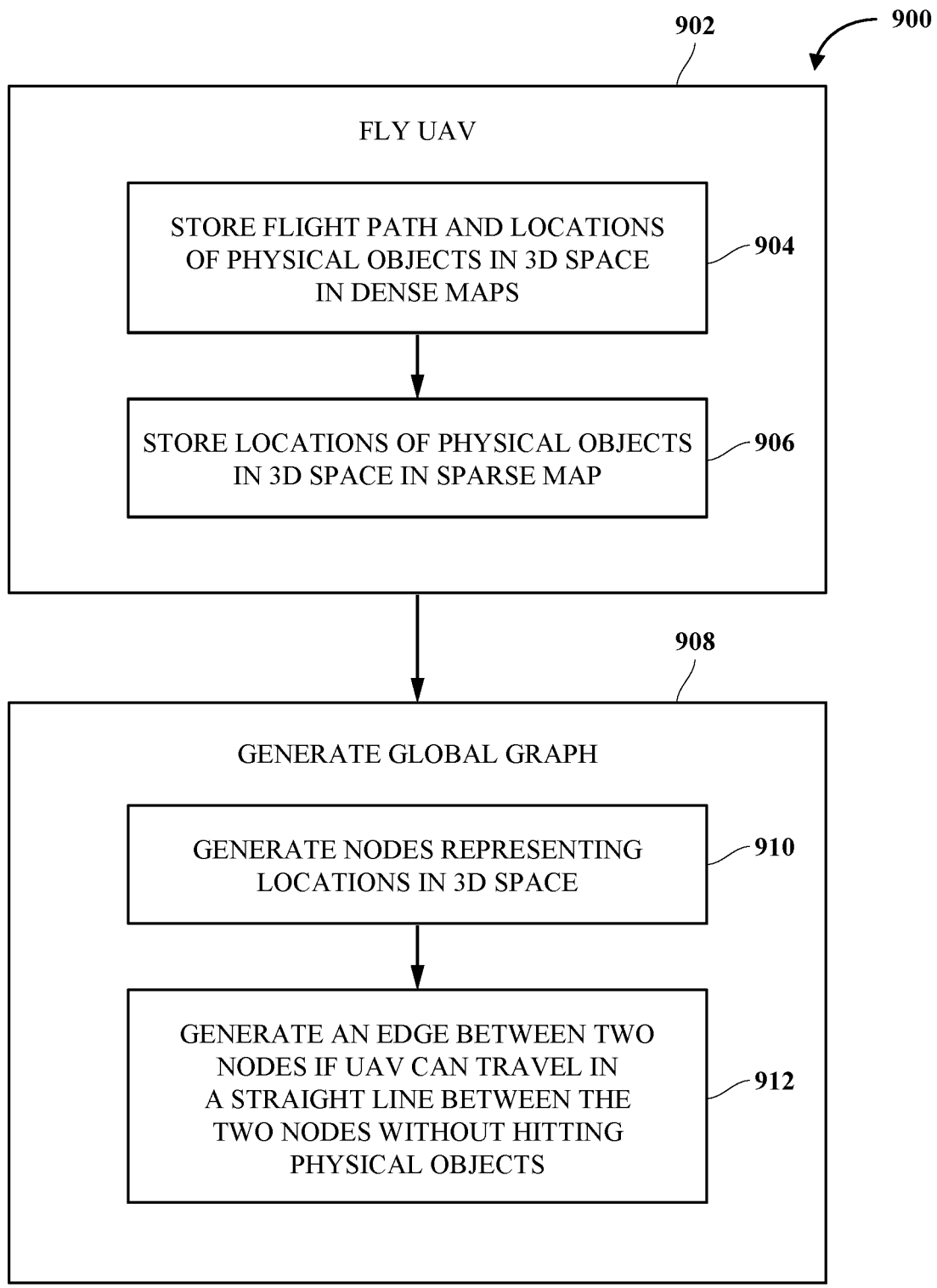
FIG. 9 is a flow chart of an example of a technique for flying a UAV and generating a global graph.

FIG. 9 is a flow chart of an example of a technique 900 for flying a UAV and generating a global graph. The technique 900 is described below as being implemented at the UAV 600. However, in alternative implementations, the technique 900 may be implemented at a UAV having a different structure from the UAV 600 or at an aerial vehicle that is not a UAV. In some implementations, the technique 900 is implemented at a computer external to the UAV 600 or other aerial vehicle.

At block 902, the UAV 600 flies in a 3D space. The 3D space may be an indoor space, an outdoor space or a mixed indoor/outdoor space. For example, the UAV 600 may fly by operating the electromechanical subsystem 602 as directed by the flight control subsystem 604. During flight, the UAV 600 implements blocks 904 and 906.

At block 904, the UAV 600 stores the flight path and locations of physical objects in 3D space in dense maps 612, as described above. Each dense map 612 may be a representation of a cubic meter (or other region) of the 3D space. Each dense map 612 may be implemented as a 3D matrix with each cell in the matrix representing one cubic centimeter and indicating whether that cubic centimeter includes a physical object.

At block 906, the UAV 600 stores locations of physical objects in the 3D space in the sparse map 614. The sparse map 614 may represent a larger region (e.g., including the entire 3D space through which the UAV 600 flies, for example, a 100 kilometer by 100 kilometer by 300 meter space or a space having other dimensions) than each dense map 612. The sparse map 614 and the dense maps 612 may be generated by the UAV 600 (or other UAVs that communicate with the UAV) flying through the 3D space and observing (e.g., using an on-board computer vision, camera, radar, or lidar system) the locations of the physical objects in the 3D space.

At block 908, the UAV 600 generates the global graph 616. The global graph 616 may be generated based on the dense maps 612 and the sparse map 614. During generation of the global graph 616, the UAV 600 implements blocks 910 and 912.

At block 910, the UAV 600 generates nodes representing locations in 3D space. Each node may be represented as a coordinate in X-Y-Z space with the origin being, for example, at the launch point (e.g., the location of the dock 106) of the UAV 600. The nodes may be locations that lack physical objects and, thus, can be physically occupied by the UAV 600. A node may, in some cases, correspond to a location previously visited by the UAV 600 or another aerial vehicle.

At block 912, the UAV generates an edge between two nodes if the UAV 600 can travel in a straight line between the two nodes without hitting physical objects. The UAV 600 may determine whether the UAV 600 can travel in the straight line between the two nodes without hitting the physical objects based on the UAV 600 having travelled in such a straight line between the two nodes or based on the dense map 612 that includes the two nodes (or two dense maps of adjacent regions that include the two nodes) not including physical objects between the two nodes. In some examples, this determination may be made based on the sparse map 614 not including physical objects between the two nodes.

Figure 10:
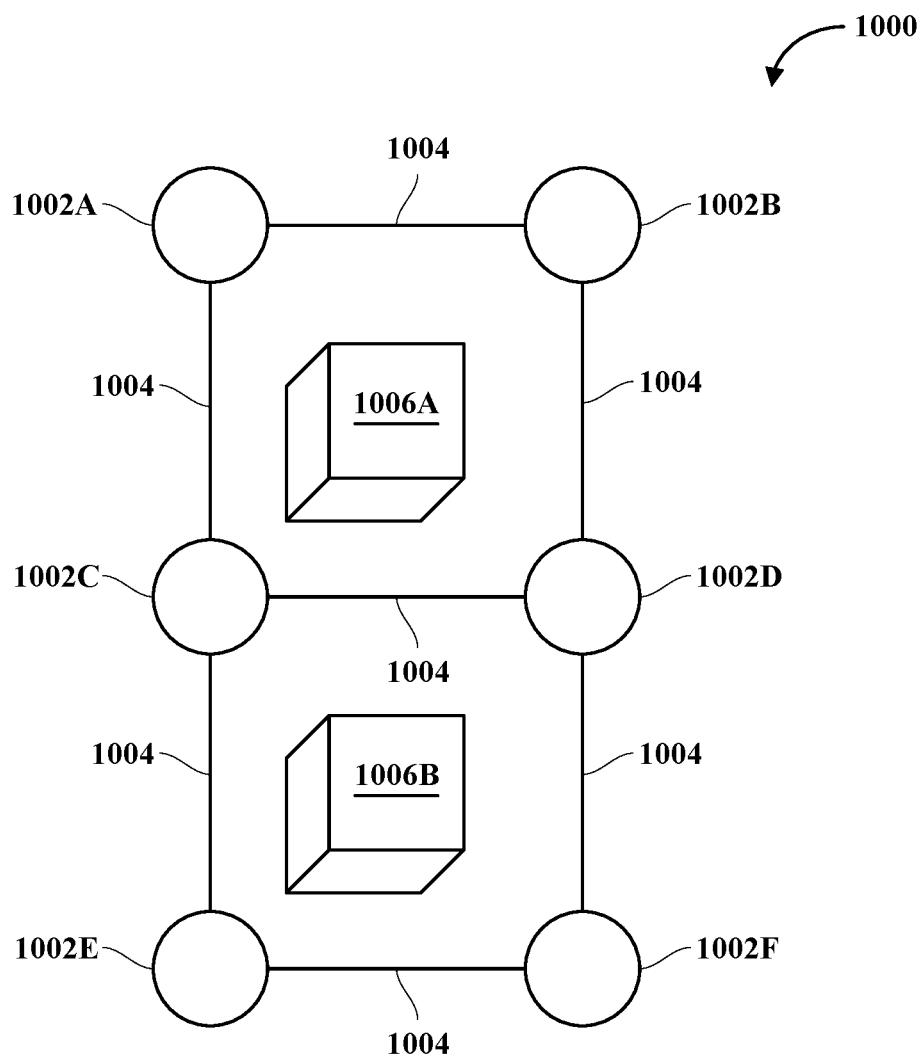
FIG. 10 is an illustration of an example global graph.

FIG. 10 is an illustration of an example of a map 1000 of a region covered by a global graph 616. As shown, the map 1000 includes nodes 1002A-1002F and edges 1004 between some of the nodes 1002A-1002F that may be stored in the global graph 616. Physical objects 1006A, 1006B are illustrated in the map 1000 to demonstrate how the global graph 616 is used but may or may not be stored in the global graph 616. As shown, the graph includes edges 1004 between nodes 1002A-1002B, 1002A-1002C, 1002B-1002D, 1002C-1002D, 1002C-1002D, 1002D-1002F, and 1002E-1002F. There is no edge between 1002A-1002D and 1002B-1002C because a straight-line path between those nodes is obstructed by the physical object 1006A. There is no edge between nodes 1002C-1002F and 1002D-1002E because a straight-line path between those nodes is obstructed by the physical object 1006B. The nodes 1002A-1002F and the edges 1004 may be generated using the technique described above in conjunction with FIG. 9.

Figure 11:
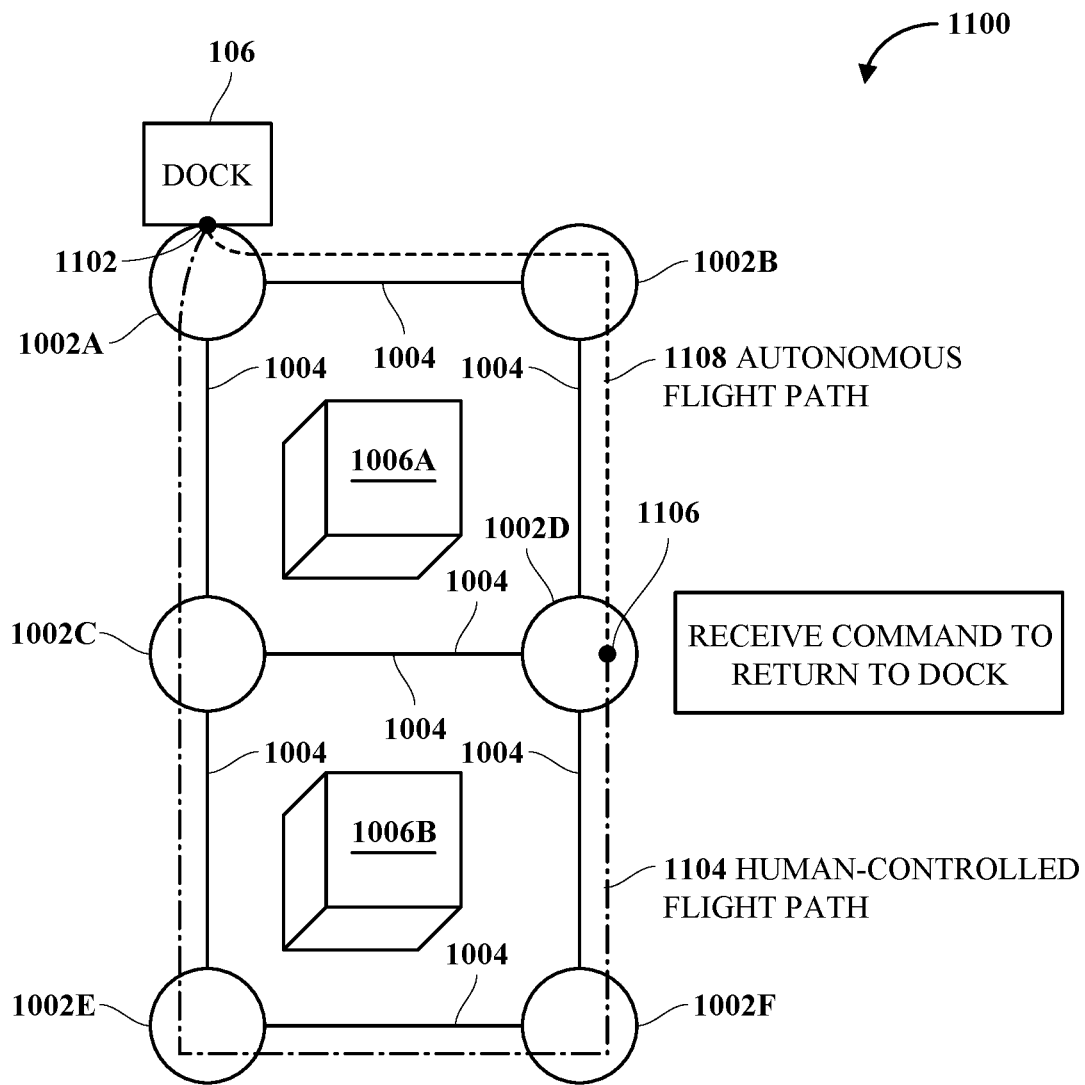
FIG. 11 is an illustration of an example flight path in a global graph.

FIG. 11 is an illustration of an example map 1100 of a flight path in a global graph. As shown, the map 1100 includes the nodes 1002A-1002F, the edges 1004, and the physical objects 1006A, 1006B described in conjunction with FIG. 10. As shown in FIG. 11, the UAV 600 (not illustrated in FIG. 11) begins a flight from a launch point 1102 at the dock 106. The launch point 1102 corresponds to the node 1002A. Initially, the UAV flies on a human-controlled flight path 1104 to point 1106. As shown, the human-controlled flight path 1104 starts at the launch point 1102 (the node 1002A) and traverses the nodes 1002C, 1002E, 1002F to terminate at the point 1106 (the node 1002D). When the UAV 600 is at the point 1106, the UAV 600 receives a command to return to the dock 106. In response to the command, the UAV 600 determines, using the global graph 616, an autonomous flight path 1108 from the point 1106 to the launch point 1102 at the dock 106. As illustrated, the UAV 600 determined the autonomous flight path 1108 from the node 1002D via the node 1002B to the node 1002A. In alternative implementations, the UAV 600 may have determined other paths from the node 1002D to the node 1002A, for example, the UAV 600 may have determined the path from the node 1002D via the node 1002C to the node 1002A or the UAV 600 may have determined a path traveling backwards (from the node 1002D to the node 1002A) along the path 1004.

As illustrated in FIG. 11, the UAV 600 may traverse a space shown in the map 1100. The UAV 600 may return to the launch point 1102 of the UAV 600 at the dock 106 in response to receiving a command to return to the dock and recognizing the location of the UAV 600 on the global graph 616. The UAV 600 may bypass the human-controlled flight path that the UAV 600 took to reach the point 1106 in order to get back to the dock 106 from the point 1106 vis the autonomous flight path 1108.

Figure 12:
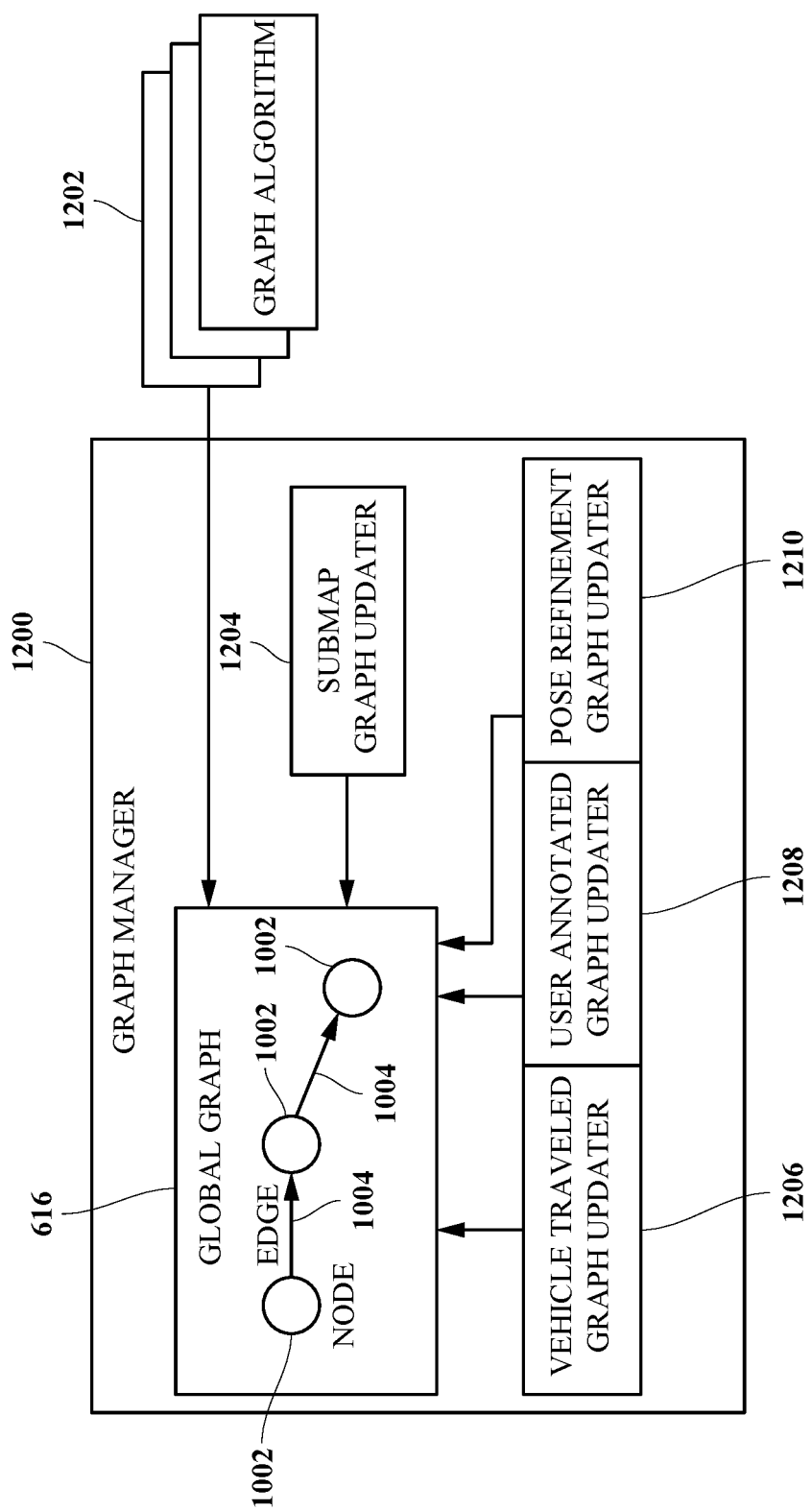
FIG. 12 is an illustration of an example graph manager.

FIG. 12 is an illustration of an example graph manager 1200, which may be implemented at the UAV 600 or at a server or a data repository in communication with the UAV 600. As shown, the graph manager 1200 stores the global graph 616, which includes the nodes 1002 and the edges 1004. The graph manager 1200 is capable of receiving graph algorithms 1202, which may leverage an API for interfacing with the global graph 616. The graph algorithms 1202 may include at least one of a navigation algorithm, a path planning algorithm, a decision-making algorithm (e.g., what the UAV 600 is to do if it detects x, y, or z), or the like.

The global graph 616 may be updated using various techniques. As shown, a submap graph updater 1204 updates the global graph 616 based on changes to a part of the global graph 616, for example, one of the dense maps 612 which was used to generate the global graph 616. The vehicle traveled graph updater 1206 updates the global graph based on information received during flight of the UAV 600 or another aerial vehicle. The user annotated graph updater 1208 updates the global graph 616 based on user annotations received from a user (e.g., via a user interface at a client device coupled to the UAV 600 or the server or a controller 104 of the UAV 600). The pose refinement graph updater 1210 updates the global graph 616 based on a pose of the UAV 600.

Some implementations relate to a global scale sparse planning representation and a corresponding computer architecture, allowing a UAV to traverse a large, complex environment. Some implementations relate to building a coherent sparse graph representation and computational framework for running and executing planning algorithms in large-scale settings (e.g., with thousands or tens of thousands of nodes). Some implementations provide an API to perform navigational tasks on the global graph. The API could be used in conjunction with other interfaces for monitoring a battery status or a health/functionality status of the UAV.

Some implementations relate to autonomous behavior of the UAV based on a stored global graph in a tele-operated or fully autonomous mission setting. Some implementations relate to returning the UAV to the launch point or other operations in response to drops in the battery change level, lighting changes, or other problems with the UAV that make returning to the launch point desirable. This may be useful in security patrol or tele-operation use cases.

Some implementations relate to multiple UAVs traversing the same 3D space. The multiple UAVs may upload data (e.g., data stored in the dense maps 612, the sparse map 614, and the global graph 616) to a server or data repository and the data at the server or the data repository may be shared with the other UAVs. As a result, the UAVs may learn about the environment being traversed from other UAVs. The stored data may be used for fully automated flights or flights controlled by a remote human operator.

In some implementations, the UAV 600 leaves a dock and flies to waypoints (e.g., nodes in the global graph 616). The UAV 600 learns about its environment during the flight. When light is available, the UAV 600 may fly around the environment to store data in the dense maps 612, the sparse map 614, and the global graph 616 for later automatic navigation.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices.

Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An unmanned aerial vehicle comprising:
 a flight control subsystem; and
 an electromechanical subsystem coupled with the flight control subsystem and configured to fly the unmanned aerial vehicle as directed by the flight control subsystem;
 wherein the flight control subsystem is configured to:
  generate dense maps during flight, wherein the dense maps represent at least a flight path and locations of physical objects in a three-dimensional space;
  generate a global graph based on the dense maps and a sparse map, the global graph comprising nodes representing locations in the three-dimensional space and edges between the nodes, a node of the nodes being associated with a time when a location represented by the node was traversed and a node probability that the location lacks a physical object, an edge of the edges being associated with an edge probability that the edge is traversable, the edge probability being determined based on a time, indicated in the dense maps or the sparse map, when an endpoint node of the edge was visited;
  receive a trigger to move the unmanned aerial vehicle to a position in the three-dimensional space;
  determine, using the global graph comprising at least one node probability and at least one edge probability, a path to the position that avoids the physical objects using the global graph in response to the trigger; and
  navigate the unmanned aerial vehicle to the position using the determined path.

2. The unmanned aerial vehicle of claim 1, wherein the flight control subsystem is further configured to:
 generate the sparse map, the sparse map comprising sparse map nodes representing sparse map locations in the three-dimensional space and sparse map edges representing connections between the sparse map locations.

3. The unmanned aerial vehicle of claim 2, wherein a sparse map edge between two sparse map nodes represents whether a sparse map path exists between the locations associated with the two sparse map nodes.

4. The unmanned aerial vehicle of claim 1, wherein determining the path to the position comprises:
 determining the path using the dense maps.

5. The unmanned aerial vehicle of claim 1, wherein the trigger comprises a request to return to a dock of the unmanned aerial vehicle, wherein the position corresponds to the dock.

6. The unmanned aerial vehicle of claim 1, wherein the flight control subsystem comprises processing circuitry and a memory, wherein the global graph is represented, in the memory, as a graph with the nodes and edges, wherein an edge between two nodes indicates whether the unmanned aerial vehicle can travel, without hitting physical objects, in an unobstructed straight line between the locations represented by the two nodes.

7. The unmanned aerial vehicle of claim 6, wherein the edge between the two nodes that indicates whether the unmanned aerial vehicle can travel in the unobstructed straight line between the two nodes is determined based on one or more of the dense maps.

8. The unmanned aerial vehicle of claim 1, the edge probability being determined based on a time when the edge was traversed.

9. The unmanned aerial vehicle of claim 1, wherein the flight control subsystem is further configured to:
 determine, during navigation of the unmanned aerial vehicle, that a first portion of the path is untraversable; and
 backtrack the unmanned aerial vehicle along a second portion of the path made up of points that the unmanned aerial vehicle previously traversed in response to determining that the first portion of the path is untraversable.

10. The unmanned aerial vehicle of claim 9, wherein the flight control subsystem determines that the first portion of the path is untraversable is based on a lack of progress of traversing the first portion of the path.

11. The unmanned aerial vehicle of claim 9, wherein the flight control subsystem determines that the first portion of the path is untraversable is based on the first portion of the path being obstructed or having dim light.

12. The unmanned aerial vehicle of claim 1, wherein the dense maps are generated using a computer vision subsystem of the unmanned aerial vehicle.

13. A non-transitory computer-readable medium storing instructions which, when executed by an on-board computer of an unmanned aerial vehicle, causes the on-board computer to perform operations comprising:
 generating dense maps during flight, wherein the dense maps represent at least a flight path and locations of physical objects in a three-dimensional space;
 generating a global graph based on the dense maps, the global graph comprising nodes representing locations in the three-dimensional space and edges between the nodes, a node of the nodes being associated with a time when a location represented by the node was traversed and a node probability that the location lacks a physical object, an edge of the edges being associated with an edge probability that the edge is traversable, the edge probability being determined based on a time, indicated in the dense maps or the sparse map, when an endpoint node of the edge was visited;
 receiving a trigger to move the unmanned aerial vehicle to a position in the three-dimensional space;
 determining, using the global graph comprising at least one node probability and at least one edge probability, a path to the position that avoids the physical objects using the global graph in response to the trigger; and
 navigating the unmanned aerial vehicle to the position using the determined path.

14. The non-transitory computer-readable medium of claim 13, wherein each of the dense maps comprises a set of cells representing a local geometry of a region in the three-dimensional space.

15. The non-transitory computer-readable medium of claim 13, wherein the trigger comprises a battery charge level falling below a battery charge threshold, wherein the position corresponds to a dock of the unmanned aerial vehicle.

16. A method comprising:
storing dense maps generated by one or more aerial vehicles;
generating a global graph based on the dense maps and a sparse map, the global graph comprising nodes representing locations in a three-dimensional space and edges between the nodes, a node of the nodes being associated with a time when a location represented by the node was traversed and a node probability that the location lacks a physical object, an edge of the edges being associated with an edge probability that the edge is traversable, the edge probability being determined based on a time, indicated in the dense maps or the sparse map, when an endpoint node of the edge was visited;
storing a representation of one or more paths traversed by the one or more aerial vehicles within the global graph;
determining, using the global graph comprising at least one node probability and at least one edge probability, a path from an origin location to a destination location based on the global graph; and
controlling, by a flight control subsystem of an unmanned aerial vehicle, operation of an electromechanical subsystem of the unmanned aerial vehicle to navigate the unmanned aerial vehicle according to the determined path.

17. The method of claim 16, wherein the node probability that the location lacks the physical object is determined based on the time when the location was traversed.

18. The method of claim 17, further comprising generating the sparse map based on the dense maps by:
reducing a resolution of at least one dense map of the dense maps to generate a reduced resolution map; and
adding the reduced resolution map to the sparse map.

19. The method of claim 17, wherein the path from the origin location to the destination location is determined based on the one or more paths traversed by the one or more aerial vehicles.

20. The method of claim 17, wherein the origin location is a current location of an aerial vehicle of the one or more aerial vehicles, and wherein the destination location is a dock of the aerial vehicle.

21. The method of claim 20, wherein the path from the origin location to the destination location is determined in response to at least one of a user request to return the aerial vehicle to the dock, an aerial vehicle battery power amount falling below a power threshold, or a brightness of light detected by a sensor at the aerial vehicle falling below a brightness threshold.

22. The method of claim 17, wherein the origin location is a current location of an aerial vehicle of the one or more aerial vehicles, and wherein the destination location is a location where the aerial vehicle last observed a subject or an object being tracked by the aerial vehicle.

23. The method of claim 17, wherein the global graph is represented, in a memory, as a graph with the nodes and edges, wherein an edge between two nodes indicates whether an aerial vehicle from the one or more aerial vehicles can travel, without hitting obstacles, in an unobstructed straight line between locations represented by the two nodes.

24. The method of claim 23, wherein the edge between the two nodes that indicates whether the aerial vehicle can travel in the unobstructed straight line between the locations represented by the two nodes is determined based on one or more of the dense maps.

25. The method of claim 17, wherein the sparse map comprises nodes representing locations in the three-dimensional space and edges representing connections between the locations.

26. The method of claim 17, wherein the global graph is generated at an on-board computer of an aerial vehicle from the one or more aerial vehicles, wherein the path is determined at the on-board computer.

* * * * *